United States Patent [19]
Jones

[11] Patent Number: 5,645,320
[45] Date of Patent: Jul. 8, 1997

[54] HEADREST SUPPORT FOR VEHICLE SEAT

[76] Inventor: Ronald Jones, 2406 Birch Dr., Silver Spring, Md. 20910

[21] Appl. No.: 589,631

[22] Filed: Jan. 22, 1996

[51] Int. Cl.⁶ .................................. A47C 1/10; A47C 7/46
[52] U.S. Cl. ........................................ 297/410; 297/391
[58] Field of Search ................................... 297/410, 391, 297/463.1, 463.2

[56] References Cited

U.S. PATENT DOCUMENTS

| | | | |
|---|---|---|---|
| 3,544,162 | 12/1970 | Uchiyamada et al. | 297/410 |
| 4,411,470 | 10/1983 | Nishimura et al. | 297/410 |
| 4,427,233 | 1/1984 | Matumoto | 297/410 X |
| 4,657,425 | 4/1987 | Takahashi | 297/410 X |
| 4,854,642 | 8/1989 | Vidwans et al. | 292/410 |
| 4,978,169 | 12/1990 | Shannon et al. | 297/410 |
| 5,156,440 | 10/1992 | Vidwans et al. | 297/410 |
| 5,445,434 | 8/1995 | Kohut | 297/391 |

*Primary Examiner*—Peter M. Cuomo
*Assistant Examiner*—Rodney B. White
*Attorney, Agent, or Firm*—Roylance, Abrams, Berdo & Goodman, L.L.P.

[57] ABSTRACT

A vehicle headrest support includes a tubular body having an elongated slot extending through the sidewall. The slot is dimensioned to permit the support to snap onto the support rod of a headrest attached to a vehicle seat. An upper surface of the support is inclined in a forward direction to tilt the headrest forward toward the occupant's head. A lower end is formed with a substantially flat surface to engage the vehicle seat. The support is particularly suitable as an aftermarket device for attaching to the support rod of an existing vehicle headrest and seat. The support attaches to the support rod of the headrest to prevent pivotal movement of the headrest with respect to the support rod and to prevent the headrest from collapsing toward the vehicle seat upon impact of the occupant's head during a rear end collision.

16 Claims, 2 Drawing Sheets

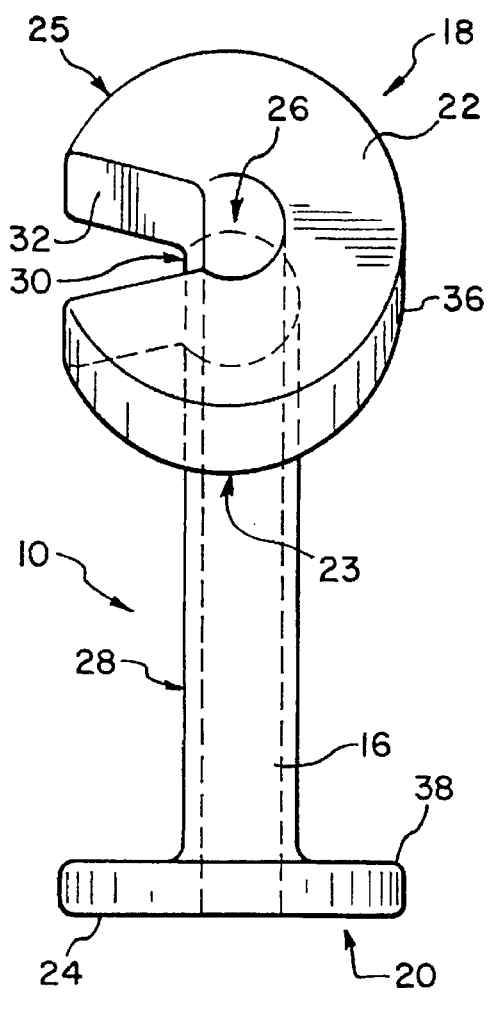
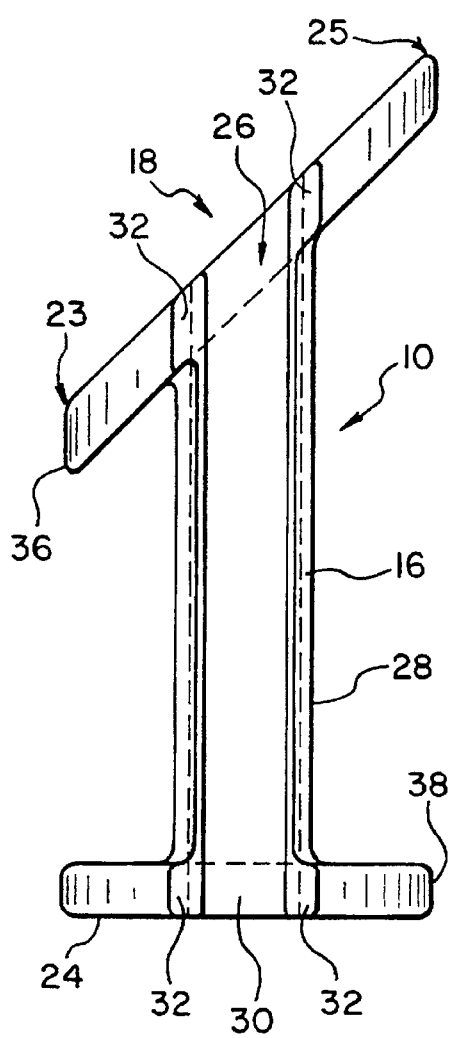
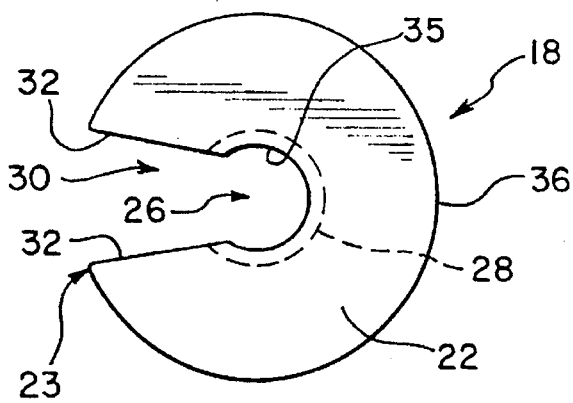

HEADREST SUPPORT FOR VEHICLE SEAT

SUMMARY OF THE INVENTION

The present invention is directed to a support structure for the headrest of a vehicle seat. More particularly, the present invention relates to an aftermarket device to maintain the headrest in the proper position.

BACKGROUND OF THE INVENTION

Headrests are required on all vehicle seats to reduce the likelihood of severe head and neck injuries caused by rear end collisions. During a rear end collision, the occupant's head is thrown backwards at great force. Initially, upon impact, the occupant's torso moves forward as the vehicle is pushed forward, while the head lags behind. The head then rotates to the rear, bending or extending the neck backward in an extension-rotation motion. Then the head rebounds forward causing a flexed neck posture. The headrest on the vehicle seat is designed to limit the rearward rotation of the head and neck thereby reducing the risk of injury.

To minimize head and neck injury, the headrest must be positioned to engage the occupant's head during impact and prevent the head from being thrown backwards. Most vehicles are provided with an adjustment mechanism to enable the headrest to be selectively adjusted at the proper height. Unfortunately, many occupants find the headrest bothersome and lower the height of the headrest to its lowermost position where it provides little or no benefit.

Moreover, the adjustment mechanism must be sufficiently strong to withstand the impact from the head during a rear end collision without flexing, bending or collapsing to an extent such that the head and neck rotate too far rearward. During impact, the occupant's head typically is thrown rearwardly and rotates where it strikes the headrest in a downwardly inclined direction. In this manner, the impact force is generally rearwardly and downwardly rather than in a rearward direction only. Therefore, it is necessary to provide a headrest which will withstand the downward force of the head during impact in addition to withstanding the rearward force.

Although most automobile manufacturers provide some means for adjusting the height of the headrest, many of these adjusting mechanisms do not withstand the impact during a rear end collision. Presently, approximately two-thirds of the vehicles on the road today have head restraints that are rated very poor by the Insurance Institute for Highway Safety. Typically, almost 60% of all claims for insured accidents are a direct result of neck injuries from whiplash. Many of those injuries are caused by rear end collisions which can cause serious and lasting injuries at speeds as low as 12 miles per hour.

The data collected by the Insurance Institute for Highway Safety shows that many of the adjustment mechanisms on the head restraints do not adequately withstand the impact during a rear end collision. The head restraints often flex and pivot or rotate backwards upon impact which allows the head of the occupant to rotate rearwardly resulting in head and neck injuries. In addition, the adjustment mechanisms are shown to fail which allows the head restraint to retract or collapse to its lowermost position during impact. With the head restraint in its lowermost position, the restraint is not able to prevent the rearward neck rotation and, thus, is not able to prevent head and neck injuries.

Numerous devices have been proposed for providing suitable locking devices for vehicle headrests. An example for such a locking mechanism is disclosed in U.S. Pat. No. 3,544,162 to Uchiyamada. This device is intended to prevent the headrest from collapsing during rear end collisions, but is not adaptable to existing headrests. Accordingly, there Is a continuing need in the art for an improved vehicle headrest.

SUMMARY OF THE INVENTION

A primary aspect of the invention is to provide a support device for engaging the headrest of a vehicle seat to maintain the headrest in the selected position.

Another aspect of the invention is to provide a support device which engages an existing headrest to prevent the headrest from collapsing when the occupant's head strikes the headrest during rear end collisions.

A further aspect of the invention is to provide a support device for a headrest to position the headrest at a suitable angle with respect to the vehicle seat to reduce the risk of injury to the occupant during rear end collisions.

These aspects are basically attained by providing a vehicle headrest support comprising: a hollow tubular body having a longitudinal dimension with an upper end for engaging a vehicle headrest and lower end for engaging a vehicle seat, and for fixing the height of the headrest with respect to the seat; the body having a longitudinal slot, whereby the hollow tubular body has a substantially O-shaped cross-section dimensioned to receive a support rod of the vehicle headrest; the body having a substantially flat surface at the lower end for engaging the vehicle seat; and the body having an inclined surface at the upper end for engaging a vehicle headrest and tilting the vehicle headrest in a forward direction.

These aspects of the invention are further attained by providing a headrest assembly for a vehicle seat comprising: a headrest; at least one support rod having an upper end coupled to the headrest and a lower end coupled to a vehicle seat; an adjustment mechanism operatively connected to the support rod for selectively adjusting the height of the headrest with respect to the vehicle seat; and a support member removably coupled to the support rod and having an upper end engaging the headrest and a lower end engaging the vehicle seat, the support member fixing the height of the headrest with respect to the vehicle seat and preventing the headrest from retracting in the event of failure of the adjustment mechanism.

These and other objects, advantages and salient features of the present invention will become apparent from the following detailed description, which, taken in conjunction with the annexed drawings, disclose preferred embodiments of the invention.

BRIEF DESCRIPTION OF THE DRAWINGS

Referring to the drawings which form a part of this original disclosure:

FIG. 1 is a front elevational view of the headrest support in accordance with a preferred embodiment of the invention;

FIG. 2 is a side elevational view of the headrest support;

FIG. 3 is a top plan view of the headrest support as seen from the top of FIG. 1.

DETAILED DESCRIPTION OF THE INVENTION

Figure 4:
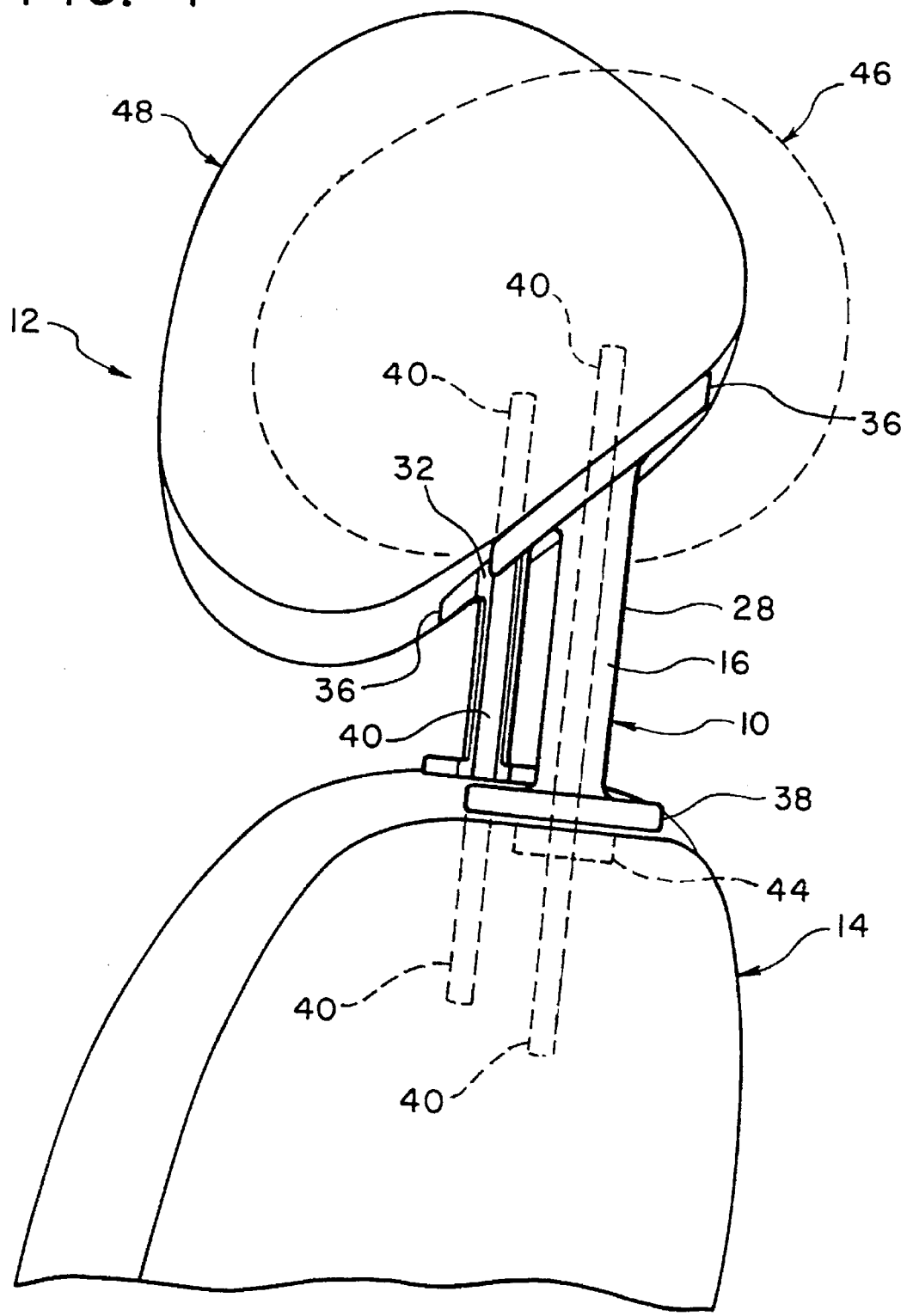
FIG. 4 is a side elevational view of the vehicle seat and headrest with the support in place.

The present invention is directed to a support 10 for maintaining a headrest 12 in a fixed position above a vehicle seat 14. The support 10 is attached to a support rod 40 extending between headrest 12 and vehicle seat 14. In preferred embodiments of the invention, the support 10 is an aftermarket device to be used in conjunction with existing headrests and the standard adjustment mechanism on the headrest. The support 10 is produced from a lightweight plastic material having sufficient strength to withstand impact during a collision. Suitable plastic materials can include, for example, polyvinyl chloride, polyesters, polyethylene, and polycarbonate resins such as those sold under the tradename LEXAN. The plastic material provides sufficient flexibility to allow the support to snap into position as discussed hereinafter in greater detail.

Referring to FIGS. 1–4, the support 10 comprises a tubular body 16 with a substantially O-shape having an upper end 18 and a lower end 20. As shown in FIGS. 1 and 2, upper end 18 has a substantially flat surface 22 which is inclined with respect to the longitudinal axis of tubular body 16. In preferred embodiments, the upper surface 22 is inclined toward a front side 23 of tubular body 16 such that the front side 23 is shorter than the rear side 25. In the embodiment shown, the inclined surface 22 is oriented at an angle of about 45° from the longitudinal axis of the tubular body 16. The angle of inclined surface 22 can be varied depending on the design of the headrest and desired tilt of the headrest to be produced by the support 10. The angle of inclination is preferably selected to tilt the headrest forward and resist rearward rotation of the headrest during impact. The lower end 20 of tubular body 16 also has a substantially flat face 24 for engaging the vehicle seat as discussed hereinafter in greater detail.

As shown in FIG. 1, tubular body 16 has a substantially cylindrical shape with a hollow central portion extending through the longitudinal axis of the hollow body. The hollow tubular body 16 has a sidewall 28 having an elongated slot 30 extending the full length of the tubular body. In preferred embodiments, the elongated slot 30 is positioned on the side of the body with respect to the upper inclined surface as shown in FIGS. 1 and 2. In alternative embodiments, the upper surface 22 is inclined away from the slot 30.

The elongated slot 30 is defined by opposing planar surfaces 32 on the sidewall 28. The planar surfaces 32 are angled to diverge outwardly from the center axis of the tubular body 16 to allow the support 10 to snap onto a support rod of the headrest. In this respect, the slot 30 has a width to allow support rod 40 to pass through when the tubular body is snapped into position. The tubular body 16 has a predetermined length to maintain the headrest at the desired height and position. The tubular body 16 is positioned on the support rod with the slot 30 facing sideways and the inclined upper surface tilting downward with respect to the forward direction of the vehicle seat.

In further embodiments, the hollow center portion 26 can include one or more ribs (not shown) extending longitudinally along an inner wall 35 of the tubular body 16 for strengthening the support 10 and for holding the support in position on the support rod of the vehicle seat. The actual number of ribs can be varied depending on the strength of the material and the thickness of the sidewall 28. In preferred embodiments, the ribs extend from the upper end 18 to the lower end 20.

The upper end 18 and lower end 20 also include an enlarged portion forming an outwardly extending flange 36 and 38, respectively. The upper flange 36 and the lower flange 38 provide a greater surface area for contact with the headrest and vehicle seat thereby providing increased support for the headrest. The upper and lower flanges 36 and 38 are dimensioned to engage the headrest and vehicle seat and prevent the headrest from collapsing during impact. In the embodiment shown, the flanges 36 and 38 are tapered gradually outward and are provided with rounded edges.

Referring to FIG. 4, the headrest 12 is supported on the vehicle seat 14 by at least one and preferably two support rods 40. The supports 10 are preferably provided in pairs so that a support can be coupled to each support rod 40 as shown in FIG. 4. The pair of supports 10 can be mirror images of each other whereby the slots 30 can face inwardly toward each other as shown in FIG. 4. Support rods 40 extend into the frame of the vehicle seat 14 in a conventional manner as known in the art. The upper end 42 of support rods 40 are connected to the headrest 12. The vehicle seat 14 is provided with a coupling mechanism 44 for providing vertical adjustment to the support rods 40 as known in the art. The coupling mechanism can be mounted on the top of the vehicle seat or inside the vehicle seat so as not to be visible during ordinary use. The coupling mechanism can be friction-type coupling means so that adjustment is made by pressing down or lifting up on the headrest. The coupling mechanism can be a mechanism such as, for example, that disclosed in U.S. Pat. No. 3,544,162 which is hereby incorporated by reference in its entirety. The support 10 is adapted for coupling to most standard vehicle headrests.

In operation, the headrest 12 assumes a normal position 46 with respect to the support rods 40 and the vehicle seat 14 as shown in FIG. 4. The headrest is raised to the desired height so that the supports 10 can be snapped onto the support rods 40 such that support rods 40 extend through the hollow center portion 26 of tubular body 16. The headrest 12 is then lowered until the headrest contacts the inclined upper face 22 and lower face 24 is in contact with the vehicle seat 14 or coupling mechanism 44. In most vehicle headrests, the headrest is not securely fixed to the support rod so that some pivotal flexing of the headrest on the support rod occurs. Snapping the support 10 onto the support rod 40 or pressing downward on the headrest 12 while in contact with the inclined surface 22 causes the headrest 12 to pivot in a forward direction with respect to the vehicle to the position shown at 48 in FIG. 4. As shown in FIG. 4, the headrest 12 is now tilted and pushed forward toward the occupant's head thereby reducing the distance between the occupant's head and the headrest. By decreasing this distance, the rearward movement of the occupant's head in a rear end collision is reduced before impacting the headrest. In addition, the supports 10 fix the height of the headrest 12 with respect to the vehicle seat and prevent the support rods 40 from retracting into the vehicle seat upon impact by the occupant's head. The angled upper surface 22 of support 10 also prevents the headrest 12 from pivoting on the support rods 40 thereby maintaining the headrest in the forward position.

In preferred embodiments, the overall length of the support 10 is provided to position the headrest 12 at a proper height to contact the occupant's head and prevent rearward movement of the occupant's head in the event of a rear end collision. In further embodiments, a disk-shaped spacer can be inserted onto the support rod below the support 10 to increase the effective length of the support and raise the height of the headrest.

While several advantageous embodiments have been disclosed to illustrate the invention, it will be understood by those skilled in the art that various changes and modifications can be made therein without departing from the scope of the invention as defined in the appended claims.

What is claimed is:

1. A vehicle headrest support comprising:

a hollow tubular body having a longitudinal dimension with an upper end for engaging and supporting a bottom surface of a vehicle headrest and lower end for engaging a top external surface of a vehicle seat, and for fixing the height of the headrest with respect to the seat by spacing the bottom surface of said vehicle headrest from said vehicle seat;

said body having a longitudinal slot, whereby said hollow tubular body has a substantially O-shaped cross-section dimensioned to receive a support rod of the vehicle headrest, said longitudinal slot extending from said upper end to said lower end of said body and said slot being dimensioned to receive said support rod in a snap-fit;

said body having a substantially flat surface at said lower end for engaging the top external surface of the vehicle seat; and said body having an inclined surface at said upper end for engaging the bottom surface of said vehicle headrest and tilting said vehicle headrest in a forward direction.

2. The headrest support of claim 1, wherein said tubular body comprises an outwardly extending flange at said lower end for engaging the top surface of said vehicle seat.

3. The headrest support of claim 1, wherein said tubular body comprises an outwardly extending flange at said upper end for engaging the bottom surface of said headrest.

4. A headrest assembly for a vehicle seat comprising:

a headrest having a bottom surface;

at least one support rod having an upper end attached to said bottom surface of said headrest and a lower end coupled to a vehicle seat, said vehicle seat having a top surface;

an adjustment mechanism coupled to said seat and operatively connected to said support rod for selectively adjusting the height of said headrest with respect to said vehicle seat; and a support member removably coupled to said support rod and having an upper end engaging said bottom surface of said headrest and a lower end engaging said top surface of said vehicle seat, said support member supporting said headrest and fixing the height of said headrest with respect to said vehicle seat and preventing said headrest from retracting in the event of failure of said adjustment mechanism.

5. The headrest assembly of claim 4, wherein said support member comprises a substantially hollow tubular body having a substantially O-shaped cross-section for receiving said support rod.

6. The headrest assembly of claim 5, wherein said support member has a substantially flat lower surface for engaging said top surface of said vehicle seat, and an inclined upper surface for engaging said bottom surface of said headrest and for tilting said headrest to a forward position with respect to said support rod and vehicle seat and for resisting rearward tilting of said headrest with respect to said support rod during impact.

7. The headrest assembly of claim 4, wherein said support member comprises an outwardly extending flange at said lower end for engaging said top surface of said vehicle seat.

8. The headrest assembly of claim 7, wherein said flange at said lower end extends substantially perpendicular to a longitudinal axis of said support member.

9. The headrest assembly of claim 4, wherein said support member comprises an outwardly extending flange at said upper end for engaging said bottom surface of said headrest.

10. The headrest assembly of claim 4, wherein said support member includes a longitudinal slot extending from said upper end to said lower end and is dimensioned for receiving said at least one support rod in a snap-fit.

11. The headrest assembly of claim 10, wherein said longitudinal slot is defined by surfaces diverging outwardly from a center axis of said support member.

12. A headrest assembly comprising:

a vehicle seat having a top external surface;

a headrest having a bottom surface and a support rod extending from said bottom surface;

an adjustable coupling mechanism attached to said vehicle seat for receiving said support rod and adjusting a height of said headrest with respect to said vehicle seat, said support rod being reciprocally received in said coupling mechanism;

a support member removably coupled to said support rod, said support member having a substantially tubular shaped body having a longitudinal slot extending from an upper end to a lower end of said support member, for removably coupling said support member to said support rod, a first outwardly extending flange at a lower end of said tubular body for engaging said top surface of said vehicle seat and a second flange at a top end of said tubular body for engaging the bottom surface of said headrest for fixing a height of said headrest with respect to said vehicle seat and limiting movement of said headrest toward said coupling mechanism.

13. The headrest assembly of claim 12, wherein said longitudinal slot in said longitudinal body is dimensioned for receiving said support rod in a snap-fit.

14. The headrest assembly of claim 12, wherein said first flange is substantially perpendicular to a longitudinal axis of said tubular body.

15. The headrest assembly of claim 14, wherein said first flange is inclined in a forward direction with respect to said longitudinal axis of said tubular body for engaging said bottom surface of said headrest and tilting said headrest in a forward direction with respect to said vehicle seat.

16. The headrest assembly of claim 15, wherein said longitudinal slot is positioned in a side portion of said tubular body.

* * * * *